United States Patent
Wakatsuki et al.

(10) Patent No.: US 7,452,842 B2
(45) Date of Patent: Nov. 18, 2008

(54) HYDROCARBON-REFORMING CATALYST AND A METHOD OF MANUFACTURING THEREOF

(75) Inventors: Toshiya Wakatsuki, Funabashi (JP); Kiyoshi Inaba, Ichikawa (JP); Hideyuki Nakajima, Chiba (JP); Eiichi Hosoya, Hachioji (JP)

(73) Assignee: Japan Oil, Gas and Metals National Corporation, Kanagawa (JP)

( * ) Notice: Subject to any disclaimer, the term of this patent is extended or adjusted under 35 U.S.C. 154(b) by 294 days.

(21) Appl. No.: 10/678,288

(22) Filed: Oct. 3, 2003

(65) Prior Publication Data

US 2004/0067848 A1 Apr. 8, 2004

(30) Foreign Application Priority Data

Oct. 4, 2002 (JP) ............................. 2002-292714
Aug. 8, 2003 (JP) ............................. 2003-289598

(51) Int. Cl.
*B01J 23/00* (2006.01)
*B01J 21/00* (2006.01)
*B01J 20/00* (2006.01)

(52) U.S. Cl. .................. 502/326; 502/327; 502/328; 502/332; 502/335; 502/337; 502/340; 502/341; 502/349; 502/350; 502/351; 502/355; 502/415; 502/439

(58) Field of Classification Search ................. 502/326, 502/327, 328, 332, 335, 337, 340, 341, 349–351, 502/355, 415, 439
See application file for complete search history.

(56) References Cited

U.S. PATENT DOCUMENTS

| | | | | | |
|---|---|---|---|---|---|
| 3,235,515 | A | * | 2/1966 | Taylor | 502/337 |
| 3,825,504 | A | * | 7/1974 | Antos et al. | 502/335 |
| 3,825,505 | A | * | 7/1974 | Hilfman | 502/335 |
| 3,907,715 | A | * | 9/1975 | Arai et al. | 502/320 |
| 3,988,263 | A | * | 10/1976 | Hansford | 502/337 |
| 3,998,758 | A | * | 12/1976 | Clyde | 502/307 |
| 4,042,532 | A | * | 8/1977 | McArthur | 502/335 |

(Continued)

FOREIGN PATENT DOCUMENTS

| JP | 07-206726 | 8/1995 |
|---|---|---|
| JP | 2002-126528 | 5/2002 |

OTHER PUBLICATIONS

Shokubai Kouza, vol. 5, Shokubai Sekkei, pp. 141-142, Catalysis Society of Japan, 1985 and translation.

*Primary Examiner*—Cam N. Nguyen
(74) *Attorney, Agent, or Firm*—The Webb Law Firm

(57) ABSTRACT

A porous preform (carrier) is soaked in an impregnating solution, which contains both of a catalytic-activity constituent, e.g. Ni and/or Co, and a carrier-forming constituent, e.g. Mg, Al, Zr, Ti and/or Ca, so as to simultaneously infiltrate the catalytic-activity and carrier-forming constituents into the porous preform. The impregnated preform is dried, calcined at a temperature of 700° C. or higher and then activated at a temperature of 500° C. or higher, whereby fine catalytic-activity particles are distributed on a surface of the porous carrier with high dispersion. Due to finely-distributed catalytic-activity particles, the surface of the catalyst is prevented from deposition of carbonaceous matters during reformation of hydrocarbon and held in an active state over a long term.

2 Claims, 1 Drawing Sheet

U.S. PATENT DOCUMENTS

| | | | | |
|---|---|---|---|---|
| 4,073,750 A * | 2/1978 | Yates et al. | ................ | 502/259 |
| 4,085,154 A * | 4/1978 | Antos et al. | ................ | 585/434 |
| 4,128,590 A * | 12/1978 | Pollitzer et al. | ............ | 585/434 |
| 4,142,962 A * | 3/1979 | Yates et al. | ................ | 208/109 |
| 4,149,998 A * | 4/1979 | Tauster et al. | .............. | 502/328 |
| 4,160,745 A * | 7/1979 | Murrell et al. | ............. | 502/185 |
| 4,191,664 A * | 3/1980 | McArthur | .................. | 502/335 |
| 4,440,874 A * | 4/1984 | Thompson | ................ | 502/327 |
| 4,440,956 A * | 4/1984 | Couvillion | ................ | 585/260 |
| 4,456,703 A * | 6/1984 | Aldridge | ................... | 502/335 |
| 4,490,480 A * | 12/1984 | Lok et al. | .................. | 502/315 |
| 4,944,985 A * | 7/1990 | Alexander et al. | .......... | 428/570 |
| 4,962,078 A * | 10/1990 | Behrmann et al. | .......... | 502/325 |
| 4,977,126 A * | 12/1990 | Mauldin et al. | ............ | 502/242 |
| 4,992,406 A * | 2/1991 | Mauldin et al. | ............ | 502/304 |
| 5,320,998 A * | 6/1994 | Horiuchi | .................... | 502/245 |
| 6,235,677 B1 * | 5/2001 | Manzer et al. | ............. | 502/232 |
| 6,423,665 B1 * | 7/2002 | Okado et al. | ................ | 502/328 |
| 6,464,946 B1 * | 10/2002 | Yamada et al. | ............. | 422/177 |
| 6,562,753 B2 * | 5/2003 | Miyoshi et al. | ............ | 502/325 |
| 6,569,803 B2 * | 5/2003 | Takeuchi | ................... | 502/328 |
| 6,582,763 B1 * | 6/2003 | Nishimura et al. | ......... | 427/216 |
| 6,852,668 B2 * | 2/2005 | de Lasa et al. | ............. | 502/337 |
| 7,005,405 B2 * | 2/2006 | Suenaga et al. | ............ | 502/439 |

* cited by examiner

HYDROCARBON-REFORMING CATALYST AND A METHOD OF MANUFACTURING THEREOF

INDUSTRIAL FIELD

The present invention relates to a catalyst for hydrocarbon-reforming that is employed when producing carbon monoxide and hydrogen from hydrocarbon such as methane, and also relates to a method of manufacturing the catalyst.

BACKGROUND

When a hydrocarbon, e.g. methane, natural gas, petroleum gas, naphtha, heavy oil or crude oil, is reacted with a reforming agent, e.g. steam, air or carbon dioxide, at a high temperature in presence of a catalyst, the hydrocarbon is reformed to a synthetic gas that is a mixed gas containing carbon monoxide and hydrogen. The synthetic gas is useful as a raw material of methanol, liquid fuel, etc. Research and development have been also carried out in order to separate hydrogen from the synthetic gas in response to advancement of fuel cells in these days. Nickel/alumina and nickel/magnesia/alumina have been used so far as hydrocarbon-reforming catalysts for production of such a synthetic gas.

In a hydrocarbon/steam reacting system, a reaction by-product, i.e. carbonaceous matters, is likely to deposit on a surface of a catalyst. Once the deposition of carbonaceous matters is formed over catalytic-activity sites of the catalyst, catalytic activities are significantly reduced. Heavy deposition of the carbonaceous matters produces unfavorable results. For instance, clogging or damage of a catalyst bed, deviation of gases flowing through a reaction zone, decrease of a ratio of the effective catalyst for reforming reactions and so on. Deposition of the carbonaceous matters on the surface of the catalyst is avoided by introducing an excess volume of steam, but introduction of excess steam unavoidably increases an energy cost and needs a large-scaled plant.

A reforming catalyst, which distributes catalytic-activity sites on a surface of a carrier with high dispersion, is proposed by JP2002-126528A, in order to inhibit deposition of carbonaceous matters without introduction of excess steam. The proposed catalyst is manufactured by preparing an aqueous solution, which contains a catalytic-activity constituent, e.g. Co or Ni, together with Mg and Ca at a specified ratio, adding such a co-precipitating agent as potassium carbonate to the aqueous solution so as to precipitate hydroxides and carbonates, drying and calcining the precipitates in an oxidizing atmosphere so as to form complex oxide granules, compressing the granules to a predetermined shape, and then calcining the green compact.

The reforming catalyst proposed by JP2002-126528A is prevented from unfavorable deposition of carbonaceous matters due to distribution of catalytic-activity sites with high dispersion, but a catalytic-activity constituent is also diffused to an inner part of the carrier body. The catalytic-activity constituent in the inner part neither comes in contact with hydrocarbon or a reforming agent nor contributes to reforming reactions. In this sense, an expensive catalytic-activity constituent is wastefully consumed. Moreover, the manufacturing process comprises a lot of steps, i.e. preparation of a Mg, Ca-containing solution, co-precipitation, aging of precipitates, washing, calcining, granulation, compression and calcining. Consequently, the reforming catalyst is very expensive due to wasteful consumption of the catalytic-activity constituent and the complicated manufacturing process.

On the other hand, an impregnating and calcining process enables manufacturing a reforming catalyst at a relatively low cost, while suppressing rises of materialistic and manufacturing costs. According to this process, an oxide of a catalytic-activity constituent is supported on a carrier, as follows: A carrier is formed to a predetermined shape and soaked in an aqueous solution containing a catalytic-activity constituent. The carrier impregnated with the catalytic-activity constituent is then dried and calcined, as disclosed in JP7-206726A.

The catalytic-activity constituent, which is infiltrated into a carrier according to a conventional impregnating and calcining process, is likely to gather and scatter as island aggregates on a surface of the carrier. The island aggregation of the catalytic-activity constituent remains as such after the impregnated carrier is calcined, or rather promotes growth of the catalytic-activity constituent up to big particles due to thermal diffusion during calcining. Consequently, the catalytic-activity sites are unevenly distributed, and numerous deposition of carbonaceous matters can not be avoided.

SUMMARY OF THE INVENTION

The present invention aims at provision of a hydrocarbon-reforming catalyst, which maintains its excellent catalytic-activity for a long time without deposition of carbonaceous matters. An object of the present invention is to support a catalytic-activity constituent as an oxide complexed with a carrier-forming constituent on a surface of a carrier with high dispersion.

The present invention proposes a hydrocarbon-reforming catalyst, which has catalytic-activity particles distributed on a surface of a carrier with the high dispersion that 80% or more of the catalytic-activity particles is shared by fine particles of 3.5 nm or less in size. The high dispersion is realized by impregnating a porous preform with an impregnating solution, which contains both of catalytic-activity and carrier-forming constituents therein, drying the impregnated preform, and calcining and activating the dried preform at high temperatures. The wording "a surface of a carrier" in this specification involves an inner part near the surface of the carrier, too.

A carrier is a porous body, which is provided by calcining a green compact containing at least one of magnesia, alumina, zirconia, titania and calcia. The porous body preferably has porosity of 10-50 vol. %, in order to support a catalytic-activity constituent as much as possible.

The porous preform is soaked in an impregnating solution, which contains at least one catalytic-activity constituent selected from Ni and Co and at least one carrier-forming constituent selected from compounds of Mg, Al, Zr, Ti and Ca, so as to simultaneously infiltrate the catalytic-activity and carrier-forming constituents into the porous preform. A mole ratio of the carrier-forming constituent to the catalytic-activity constituent in the impregnating solution is preferably adjusted to a value within a range of 0.5-5.

The impregnated porous preform is dried and calcined at a temperature of 700° C. or higher in an oxidizing atmosphere. The catalytic-activity constituent is reacted with the carrier-forming constituent and converted to a complex oxide during calcining. The calcined body is then activated at a temperature of 500° C. or higher in a reducing atmosphere. Fine catalytic-activity particles, which are produced from the complex oxide by activation, are uniformly distributed on a surface of a carrier with high dispersion.

In a hydrocarbon-reforming process, a synthetic gas is produced from a hydrocarbon(s) according to the formulas (1) to (4), while carbonaceous matters are deposited on a surface of a catalyst according to the formulas (5) to (8). Any of the reactions (1) to (8) occur on the surface of the catalyst. The carbonaceous matters accumulate at boundaries between the catalytic-activity and carrier-forming constituents, deactivate and wreck the catalyst in the end. Even in the case where the catalytic-activity is not degraded so much, accumulation of the carbonaceous matters causes deviation of gases passing through a reaction zone and raises a ratio of the catalyst ineffective for the reforming reactions.

$$CH_4 + CO_2 \Leftrightarrow 2CO + 2H_2 \tag{1}$$

$$CH_4 + H_2O \Leftrightarrow CO + 3H_2 \tag{2}$$

$$C_nH_m + nH_2O \Rightarrow nCO + (n+m/2)H_2 \tag{3}$$

$$CO_2 + H_2 \Leftrightarrow CO + H_2O \tag{4}$$

$$2CO \Leftrightarrow C + CO_2 \tag{5}$$

$$CH_4 \Leftrightarrow C + 2H_2 \tag{6}$$

$$CO + H_2 \Leftrightarrow C + H_2O \tag{7}$$

$$C_nH_m \Rightarrow nC + m/2H_2 \tag{8}$$

Accumulation of carbonaceous matters is suppressed by minimizing a catalytic-activity constituent, which is supported on a carrier, to fine particles. An effect of particle size of the catalytic-activity constituent on accumulation of carbonaceous matters probably explained by acceleration of reverse reactions compared with the carbonaceous matter-depositing reactions (5) to (8) in correspondence to minimization of the catalytic-activity particles. An oxidizing power of the catalytic-activity particles present on a surface of the carrier for reactions of $C+O_2 \rightarrow CO_2$ and $C+CO_2 \rightarrow 2CO$ may be also effective for prevention of the accumulation. As particle size of the catalytic-activity constituent is smaller, the carbonaceous matters are less accumulated. Any accumulation of the carbonaceous matters is not substantially detected, when a catalytic-activity constituent is of 3.5 nm or less in particle size.

The inventive hydrocarbon-reforming catalyst has very fine catalytic-activity particles distributed on a surface of a carrier with high dispersion to realize the effect of dense distribution of fine catalytic-activity sites on prevention of accumulation of carbonaceous matters. Due to dense distribution of the catalytic-activity sites, the catalyst also maintains its excellent activity for a long time, and the reforming reactions (1)-(4) are efficiently promoted even in the state that a feed rate of a reforming agent such as steam is reduced.

BEST MODES OF THE INVENTION

Figure 1:
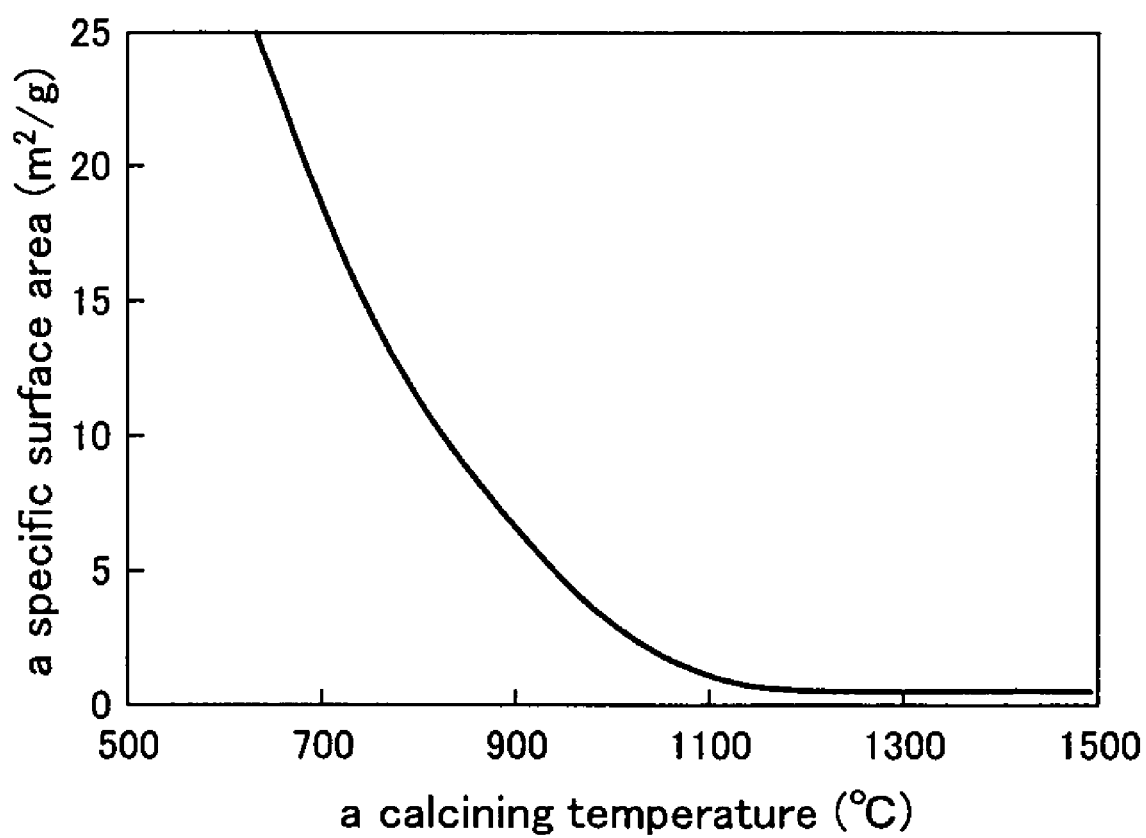
FIG. 1 shows an effect of a calcining temperature on a specific surface area of catalysts.

A hydrocarbon-reforming catalyst comprises a catalytic-activity constituent, e.g. Ni or Co, and a carrier, which is a porous body of magnesia, alumina, zirconia, titania and/or calcia. The catalytic-activity constituent together with a carrier-forming constituent is supported as a complex oxide on the porous carrier, as follows: At first, a porous preform is soaked in an impregnating solution, which contains both of the catalytic-activity and carrier-forming constituents. After the porous preform raised from the impregnating solution and dried, it is calcined at an elevated temperature. The catalytic-activity constituent is reacted with the carrier-forming constituent and converted to a complex oxide during the high-temperature calcining. When the calcined body is heated again in a reducing atmosphere, the catalytic-activity constituent is precipitated as fine particles. Since the catalytic-activity particles are precipitated from the complex oxide (in other words, a homogeneous solid solution), they are distributed with high dispersion on the surface of the porous carrier.

[Preparation of an Impregnating Solution]

An impregnating solution is prepared by dissolving catalytic and carrier-forming constituents in water. The catalytic-activity constituent may be salts or compounds of Ni and/or Co. The carrier-forming constituent, which does not have catalytic-activity by itself and forms an oxide similar to or different from a porous preform (carrier), may be compounds of Mg, Al, Zr, Ti and/or Ca. Some of these compounds are used in mixed state as the catalytic-activity or carrier-forming constituents. The catalytic-activity and carrier-forming constituents may be added as organic salts, e.g. acetate or formate, or inorganic salts, e.g. nitrate or chloride, in water.

A mole ratio of a carrier-forming constituent to a catalytic-activity constituent is preferably adjusted to a value within a range of 0.5-5. Aggregation of the catalytic-activity constituent is inhibited by controlling the mole ratio not less than 0.5, so as to enable distribution of catalytic-activity particles with high dispersion from a complex oxide in a calcined state. However, an excess mole ratio above 5 means a decrease of the catalytic-activity constituent and reduces a number of catalytic-activity sites. In the case where an impregnating solution contains the same kind of a carrier-forming constituent as the porous preform (carrier), the excess mole ratio of the carrier-forming constituent causes unfavorable dissolution of the porous preform into the impregnating solution, resulting in poor strength of the porous carrier.

[Impregnation]

The catalytic-activity and carrier-forming constituents are simultaneously infiltered into the porous preform (carrier) by soaking the porous preform in the impregnating solution, which contains both of the catalytic and carrier-forming constituents. The porous preform is prepared by compressing one or more powdery oxides selected from magnesia, alumina, zirconia, titania and calcia to a predetermined shape, and calcined the green compact, although there are no special restrictions on the kind of the porous preform as far as the catalytic-activity and carrier-forming constituents can be supported on the porous preform. Exceptionally, silica is not a proper material of the porous preform, since it is reduced and sublimed by reaction with carbon monoxide, which will be produced during hydrocarbon-reforming. A complex oxide of Co and Mg, to which one or more compounds of Mn, Mo, Rb, Ru, Pt, Pd, Cu, Ag, Zn, Sn, Pb, La and Ce are added as co-catalysts, may be used, instead.

A porous preform has a large specific surface area suitable for supporting a large amount of a catalytic-activity constituent, due to the structure that many pores are opened at its surface. An amount of the catalytic-activity constituent supported by the carrier is varied in correspondence with porosity of the carrier, but the carrier is more weakened as an increase of porosity. In this sense, the porosity of the preform is preferably adjusted to a value within a range of 10-50 vol. %, accounting a proper supporting rate of the catalytic-activity constituent in relation with strength of the porous carrier. The porous preform is prepared by compressing or extruding an inorganic powdery composition, which is optionally mixed with graphite as a lubricant, cement and/or a binder for improvement of strength, to a predetermined shape, and calcining a green compact with a heat. The porosity of the porous preform is controlled to the proper value by density of the green compact, addition of a foaming agent and so on.

The porous preform is soaked in the impregnating solution under the condition that the catalytic-activity constituent will be supported on a surface of a carrier at a ratio of 0.5-5 mole %. For instance, the porous preform is soaked 5-60 minutes in an impregnating solution, which contains 0.1-10 mole/liter of a catalytic-activity constituent and 0.05-50 mole/liter of a carrier-forming constituent, at 0-80° C. An amount of the catalytic-activity constituent, which is supported on the carrier, can be measured by X-ray fluorescence analysis or atomic absorption spectrometry. A supporting rate of the catalytic-activity constituent less than 0.5 mole % is insufficient for catalytic-activity for the purpose. But, a supporting rate above 15 mole % rather impedes distribution of catalytic-activity sites with high dispersion and causes deposition of carbonaceous matters.

[Drying]

The impregnated porous preform is dried and desiccated with a heat in prior to calcining. Since evaporation of water is accelerated as elevation of a temperature, a drying temperature is preferably kept at 100° C. or higher so as to complete the desiccation in a short time. When the impregnated porous preform is sufficiently desiccated, a part of crystal water is also removed from the porous preform, so that the porous preform will be calcined with less volumetric shrinkage in the following step. On the other hand, insufficient desiccation causes bumping of residual water and volumetric shrinkage of the porous preform in the calcining step, resulting in damage of a porous body. Whether the desiccation is sufficient or insufficient is judged by weight loss of a dry preform in comparison with a wet preform.

[Calcining]

When the dry preform is calcined in an oxidizing atmosphere such as the atmosphere, the catalytic-activity and carrier-forming constituents are oxidized and converted to a complex oxide. The complex oxide is uniformly distributed on a surface of the porous body, since it is produced from the catalytic-activity and carrier-forming constituents, which have simultaneously transferred from the impregnating solution to a surface of the porous preform. An inner part of the porous preform in the vicinity of its surface also serves as a base for supporting the catalytic-activity constituent. Consequently, the catalytic-activity constituent is distributed with higher dispersion, compared with a conventional impregnating and calcining process wherein the catalytic-activity constituent is likely to disperse as island aggregates due to precipitation from an aqueous solution, which contains the catalytic-activity constituent only. Uniform distribution of the catalytic-activity constituent on the surface of the porous body remarkably increases a rate of the catalytic-activity constituent effective for catalytic reactions, compared with a conventional co-precipitating process, resulting in saving consumption of the catalytic-activity constituent.

A complex oxide as a precursor of catalytic-activity particles is produced by calcining the impregnated porous preform at a high temperature in the atmosphere, whereby the catalytic-activity constituent is reacted with the carrier-forming constituent and converted to a nano-complexed compound (i.e. a solid solution). Complexity of the oxide depends on a calcining temperature, and a specific surface area of the oxide is reduced in correspondence to advance of complication, as noted in FIG. 1. In the nano-complexed state, the catalytic-activity and carrier-forming constituents are distributed with high-grade uniformity enough to suppress growth of catalytic-activity particles, which will be produced from the complex oxide in the following activating step.

A calcining temperature shall be 700° C. or higher in order to give a specific surface area of 20 $m^2/g$ or less, effective for catalytic reactions, to a hydrocarbon-reforming catalyst. For instance, a specific surface area of a Co/Mg complex oxide is reduced to 7.5 $m^2/g$ at 900° C., 2.4 $m^2/g$ at 1050° C. and 0.1 $m^2/g$ or less at 1300° C. or higher. However, an excessively high calcining temperature above 1300° C. causes significant reduction of pores necessary for catalytic reactions and often degrades activity of the catalyst. A calcining period is properly determined within a range of 1-20 hours.

[Activation]

After the high-temperature calcining, the hydrocarbon-reforming catalyst is activated in a reducing atmosphere. During activation, the catalyst is heated at a higher temperature in comparison with conventional activation of a nickel or cobalt oxide catalyst. Numerous catalytic-activity sites come out on a surface of the carrier with high dispersion due to combination of the high-temperature calcining with the high-temperature activation. Consequently, the activated catalyst produces fruitful results on hydrocarbon-reforming reactions. The effects of the high-temperature activation on distribution of catalytic-activity sites will be understood from results in Examples.

The calcined porous body is heated 0.5-30 hours at a temperature within a range of 500-1000° C. (preferably 600-1000° C., more preferably 650-1000° C.) in a reducing atmosphere such as $H_2$ or $H_2+N_2$ during activation. The catalytic-activity constituent, which has been distributed in the complex oxide, is reduced to an active metal or metal oxide. Activation may be performed in a hydrocarbon-reforming reactor.

[State of an Activated Hydrocarbon-reforming Catalyst]

Presence of catalytic-activity particles on the surface layer of a porous body is noted by observation of the activated catalyst, but catalytic-activity particles are scarcely detected at an inner part deep from a surface of the porous body. The catalytic-activity particles are of approximately 2.5 nm in average size, and 80% or more of the catalytic-activity particles is shared by fine particles of 3.5 nm or less in size. The catalytic-activity particles are uniformly distributed with high dispersion, which cannot be attained by a conventional co-precipitating process or a conventional impregnating and calcining process. Such uniform distribution of the catalytic-activity particles imparts extremely-high activity to the inventive hydrocarbon-reforming catalyst without accumulation of carbonaceous matters.

Dispersion of a catalytic-activity constituent, which means a size of catalytic-activity particles present on a surface of a carrier, is evaluated by a diameter in case of granular particles. Presume that catalytic-activity particles are uniform in shape and size. Dispersion d has a relationship of $d=A/D$ [wherein A is a constant calculated as a product of a profile constant×a number of metallic atoms×(density×Avogadro's number×an area shared by atoms)$^{-1}$] with an average size D of the catalytic-activity particles. It is understood from the relationship that the dispersion d is more intensified as a decrease of the average size D. The catalytic-activity particles, whose 80% or more is shared by fine particles of 3.5 nm or less in size, are fairly smaller in size and distributed with higher-grade dispersion, compared with catalytic-activity particles produced by a conventional impregnating and calcining process.

[Reforming of Hydrocarbon]

Any hydrocarbon, which is obtained from natural gas, petroleum gas, naphtha, heavy oil, crude oil, coal or coal sand, can be processed for production of a synthetic gas, as far as it contains such a hydrocarbon as methane. Two or more hydrocarbons may be mixed together to prepare a feed gas for the reforming process.

One or more of steam, carbon dioxide, oxygen and air are used as a reforming agent(s) for production of a synthetic gas from hydrocarbon(s) according to the formulas (1) to (4).

Feed rates of hydrocarbon and a reforming agent are controlled in a manner such that a mole ratio of the reforming agent to hydrocarbon is held at 0.3-100 (preferably 0.3-10, more preferably 0.5-3). Since the inventive reforming catalyst prevents deposition and accumulation of carbonaceous matters thereon, it is not necessary to supply an excess volume of the reforming agent to a reaction zone. A synthetic gas can be actually produced with high performance for a long time without deposition of carbonaceous matters under stable conditions free from deviation of gas flows, even when methane (a hydrocarbon) is reacted with a stoichiometric or quasi-stoichiometric volume of steam (a reforming agent).

A hydrocarbon gas or gases are preferably supplied to a reaction zone at a space velocity (GHSV: a quotient into which a feed rate of hydrocarbon is divided by a volume of a catalyst) of 500-200,000 $h^{-1}$ (preferably 1000-100,000 $h^{-1}$, more preferably 1000-70,000 $h^{-1}$). A gaseous mixture of hydrocarbon with the reforming agent may further contain nitrogen or other inert gas as a diluent.

The gaseous mixture of hydrocarbon with the reforming agent is supplied to a reactor filled with a reforming catalyst and reacted at a temperature within a range of 500-1000° C. (preferably 600-1000° C., more preferably 650-1000° C.) with a pressure within a range of 0.1-10 MPa (preferably 0.1-5 MPa, more preferably 0.1-3 MPa) for production of a synthetic gas.

INVENTIVE EXAMPLE

A porous preform was prepared by compressing magnesia powder to a cylindrical shape, which had an axial through hole at its center, of 6 mm in inner diameter, 16 mm in outer diameter and 16 mm in height and calcining it at 1100° C.

An impregnating solution was an aqueous solution, which contained 3 mole % of $Co(NO_3)_2.6H_2O$ and 6 mole % of $Mg(NO_3)_2.6H_2O$ at a Mg/Co mole ratio of 2.

The porous preform (100 kg) was soaked 30 minutes in the impregnating solution (20 liters) held at an ordinary temperature, raised from the impregnating solution and then dried 12 hours at 120° C. in the atmosphere. The soaking and drying were repeated three times until a supporting rate of Co (a catalytic-activity constituent) reached 3 mole %.

After the final drying, the porous preform impregnated with cobalt and magnesium nitrates was calcined 5 hours at 1250° C. in the atmosphere, whereby a complex oxide of Co and Mg was formed on a surface of the porous body (i.e. the calcined porous preform).

The porous body (4 liters) coated with the complex oxide was packed as a catalyst in a flow-type fixed bed reactor of 50 mm in inner diameter and 2,000 mm in effective catalyst length. The reactor was held at 850° C., while introducing hydrogen gas, so as to activate the catalyst. The activated catalyst was sampled from the reactor and observed by a microscope. As a result, it was noted that catalytic-activity particles of approximately 2.5 nm in size were distributed with high dispersion on a surface of the porous body and that 80% or more of the catalytic-activity particles was shared by fine particles of 3.5 nm or less in size.

Thereafter, a mixture of methane, carbon dioxide and steam was supplied to the reactor, which held at an outlet temperature of 900° C. with a reaction pressure of 2.0 MPa, under the reforming conditions shown in Table 1.

TABLE 1

| Conditions Of Hydrocarbon-Reforming Reaction | | |
|---|---|---|
| Mole ratios to number of Carbon atoms in methane | Steam | 1.0 |
| | Carbon dioxide | 0.4 |
| Feed rates ($Nm^3/hr.$) | Methane | 5.0 |
| | Steam | 5.0 |
| | Carbon dioxide | 2.0 |
| A space velocity (GHSV) | | 3000 $h^{-1}$ |
| An inlet temperature of a reactor | | 550° C. |

Comparative Example 1

An aqueous solution, which contained 0.111 mole/liter of $Co(NO_3)_2.6H_2O$ and 2.11 mole/liter of $Mg(NO_3)_2.6H_2O$, was prepared by dissolving 1.62 kg of $Co(NO_3)_2.6H_2O$ and 27.1 kg of $Mg(NO_3)_2.6H_2O$ in 50 liters of pure water. The aqueous solution was held at 50° C. and adjusted to pH 9 by adding 59 liters of a 2 mole/liter-potassium carbonate solution thereto, in order to co-precipitate Co and Mg-containing compounds. The resultant precipitate was filtered, washed and dried 12 hours at 120° C. in the atmosphere.

The dry precipitate was calcined 4 hours at 450° C. in the atmosphere, compressed to the same cylindrical shape as in Inventive Example and further calcined 5 hours at 1250° C. in the atmosphere. The resultant reforming catalyst was packed in a flow-type fixed bed reactor, activated and used for production of a synthetic gas under the same conditions as in Inventive Example.

Comparative Example 2

A porous body (carrier) was prepared by compressing and calcining magnesia powder to the same cylindrical shape as in Inventive Example. The porous body (10 kg) was soaked 3 hours in a 3 mole %-$Co(NO_3)_2.6H_2O$ aqueous solution, raised from the aqueous solution and dried 12 hours at 120° C. The soaking and drying were repeated twice until a supporting rate of Co (a catalytic-activity constituent) reached 3 mole %. Thereafter, the impregnated porous body was calcined 5 hours at 1250° C. in the atmosphere. The resultant catalyst was packed in a flow-type fixed bed reactor, activated and used for production of a synthetic gas.

The reforming catalyst was sampled from the reactor after 50 hours reactions in any of Inventive and Comparative Examples, and subjected to thermogravimetric analysis for measuring a rate of carbon deposited on a surface of the catalyst. Results are shown in Table 2, together with rates of a synthetic gas and a cost of the catalyst. The rates of the synthetic gas are values calculated by periodical quantitative analysis of CO and $H_2$ discharged from the reactor. The costs of the catalysts are represented by relative values in relation with a cost of the reforming catalyst of Comparative Example 1 as a reference (=1).

Results of Table 2 shows that the reforming catalyst of Inventive Example had catalytic-activity equal to the catalyst of Comparative Example 1, which was prepared by co-precipitation, and advantageously prevented deposition of carbonaceous matters even after long run of reforming reactions. Consequently, a synthetic gas was produced under stable conditions.

On the other hand, the reforming catalyst of Comparative Example 2, which was prepared by a conventional impregnating and calcining process, reduced productivity of a synthetic gas as time course of reforming reactions and had many deposition of carbonaceous matters on its surface. The results show decrease in a ratio of the catalyst activity for reforming reactions, since deposition of carbonaceous matters on catalytic-activity sites and deviation of gases passing through the reactor caused the increase of the catalyst, which did not have catalytic activity.

TABLE 2

Rates of Synthetic Gas and Deposition of Carbonaceous Matters

| | | | Inventive Example | Comparative Example 1 | Comparative Example 2 |
|---|---|---|---|---|---|
| Deposition rates (mass %) Of carbonaceous matters | | | 0.70 | 0.51 | 10.69 |
| Rates (Nm³/hr) of Synthetic Gas | After 10 hrs. | CO | 4.6 | 4.6 | 4.5 |
| | | $H_2$ | 9.6 | 9.6 | 9.4 |
| | After 20 hrs. | CO | 4.6 | 4.6 | 4.4 |
| | | $H_2$ | 9.6 | 9.6 | 9.2 |
| | After 30 hrs. | CO | 4.6 | 4.6 | 4.2 |
| | | $H_2$ | 9.6 | 9.6 | 8.9 |
| | After 40 hrs. | CO | 4.6 | 4.6 | 4.0 |
| | | $H_2$ | 9.6 | 9.6 | 8.4 |
| | After 50 hrs. | CO | 4.6 | 4.6 | 3.7 |
| | | $H_2$ | 9.6 | 9.6 | 7.7 |
| Manufacturing costs of catalysts | | | 0.4 | 1 | 0.4 |

After 50 hours reactions, each catalyst was sampled from the reactor and subjected to surface observation. Any catalyst of Inventive Example and Comparative Example 1 maintained its original particle size of 2.5 nm in average, while some catalytic-activity particles of Comparative Example 2 grew up to 100 nm or bigger in size. The results show that increase in a deposition rate of carbonaceous matters was caused by growth of the catalytic-activity particles.

According to the present invention as mentioned above, a porous preform is soaked in an impregnating solution, which contains both of catalytic-activity and carrier-forming constituents, dried, calcined and then activated, whereby numerous fine catalytic-activity particles are distributed on a surface of a porous carrier with high dispersion. Since carbonaceous matters, which deposit on the surface of the catalyst during hydrocarbon-reforming, are oxidatively removed due to finely-distributed catalytic-activity particles, the catalyst is always held in a surface state full of catalytic-activity sites suitable even for long-run reforming reactions. The high dispersion catalytic-activity particles on the porous carrier have efficient reforming activity, without wasteful consumption of an expensive catalytic-activity constituent, and the process for manufacturing the catalyst is also simplified in comparison with the conventional impregnating process. Consequently, a hydrocarbon-reforming catalyst with high performance is offered at a low cost.

The invention claimed is:

1. A hydrocarbon-reforming catalyst, comprising:
   a porous carrier body, formed from at least one oxide powder selected from the group consisting of magnesia, alumina, zirconia, titania and calcia; and
   catalytic-activity particles, distributed on the surface of the porous carrier body, wherein 80% or more of the catalytic-activity particles are 3.5 nm or less in size,
   the catalytic-activity particles are produced by activating an oxidized catalytic-activity constituent, which is distributed in a complex oxide;
   the complex oxide comprises (i) at least one catalytic-activity constituent selected from the group consisting of salts or compounds of at least one of Ni and Co, and (ii) at least one carrier-forming constituent selected from the group consisting of salts or compounds of at least one of Mg, Al, Zr, Ti and Ca; and
   the complex oxide is formed by impregnating both the catalytic-activity constituent and the carrier-forming constituent on the surface of the porous carrier body, and calcinating the porous carrier body having the catalytic-activity constituent and the carrier-forming constituent.

2. The hydrocarbon-reforming catalyst according to claim 1, wherein the catalytic-activity particles are Ni, Co or a mixture of Ni and Co.

\* \* \* \* \*

UNITED STATES PATENT AND TRADEMARK OFFICE
CERTIFICATE OF CORRECTION

PATENT NO. : 7,452,842 B2
APPLICATION NO. : 10/678288
DATED : November 18, 2008
INVENTOR(S) : Wakatsuki et al.

Page 1 of 1

It is certified that error appears in the above-identified patent and that said Letters Patent is hereby corrected as shown below:

<u>On the Title Page</u>, See Item (73) Assignee: should read as follows:

--Japan Oil, Gas and Metals National Corporation, Kanagawa (JP), and
Japan Petroleum Exploration Co., Ltd., Tokyo (JP)--

Signed and Sealed this

Ninth Day of June, 2009

JOHN DOLL
*Acting Director of the United States Patent and Trademark Office*